(12) United States Patent
Malcorps et al.

(10) Patent No.: US 7,160,563 B1
(45) Date of Patent: Jan. 9, 2007

(54) METHOD FOR PREPARING BEER

(75) Inventors: Philippe Malcorps, Jodoigne (BE);
Stephane Dupire, Orp-Le-Grand (BE);
Erik Van Den Eynde, Winkselle (BE)

(73) Assignee: Interbrew (BE)

( * ) Notice: Subject to any disclaimer, the term of this patent is extended or adjusted under 35 U.S.C. 154(b) by 0 days.

(21) Appl. No.: 09/284,816

(22) PCT Filed: Oct. 31, 1996

(86) PCT No.: PCT/IB96/01171

§ 371 (c)(1),
(2), (4) Date: Jun. 14, 1999

(87) PCT Pub. No.: WO98/18902

PCT Pub. Date: May 7, 1998

(51) Int. Cl.
*C12C 3/00* (2006.01)
*C12C 11/00* (2006.01)

(52) U.S. Cl. ........................ 426/16; 426/29; 426/330.4; 426/592; 426/600

(58) Field of Classification Search .................. 426/11, 426/16, 28, 29, 330.4, 592, 600, 661
See application file for complete search history.

(56) References Cited

U.S. PATENT DOCUMENTS 4,335,110 A * 6/1982 Collins ........................ 424/642

FOREIGN PATENT DOCUMENTS

SU 685689 * 8/1979

OTHER PUBLICATIONS

Christmas Cheer with Beer http /realbeer com nz/library/authors/mcinnes-n/199404xmascheerwithbeer html.*
Neil McInnes, Christmas Cheer with Beer, http://www.brewing.co.nz/neil.mcinnes/199404xmascheerwithbeer.htm, Apr. 1994.*
Brasserie Achouffe, http://www.artsanpress.u-net.com/Wallonia/Brewery/Achouffe/achouffe.html,1997.*
P.R. Ashurst, Ed., Production and Packaging of Non-Carbonated Fruit Juices and Fruit Beverages, pp. 174-176, 1995.*
http://www.newglarusbrewing.com/awards.html and New Glarus Apple Ale lable.*
Cock's Fine Brews, http://www.notchturner.com.cocks.frutopen.htm.*

\* cited by examiner

*Primary Examiner*—Arthur L. Corbin
(74) *Attorney, Agent, or Firm*—Bachman & LaPointe

(57) ABSTRACT

A method of preparing beer from beer wort including adding amidated pectin to the wort or beer to inhibit coagulation and precipitation of proteins and to obtain a haze in the beer.

22 Claims, 3 Drawing Sheets

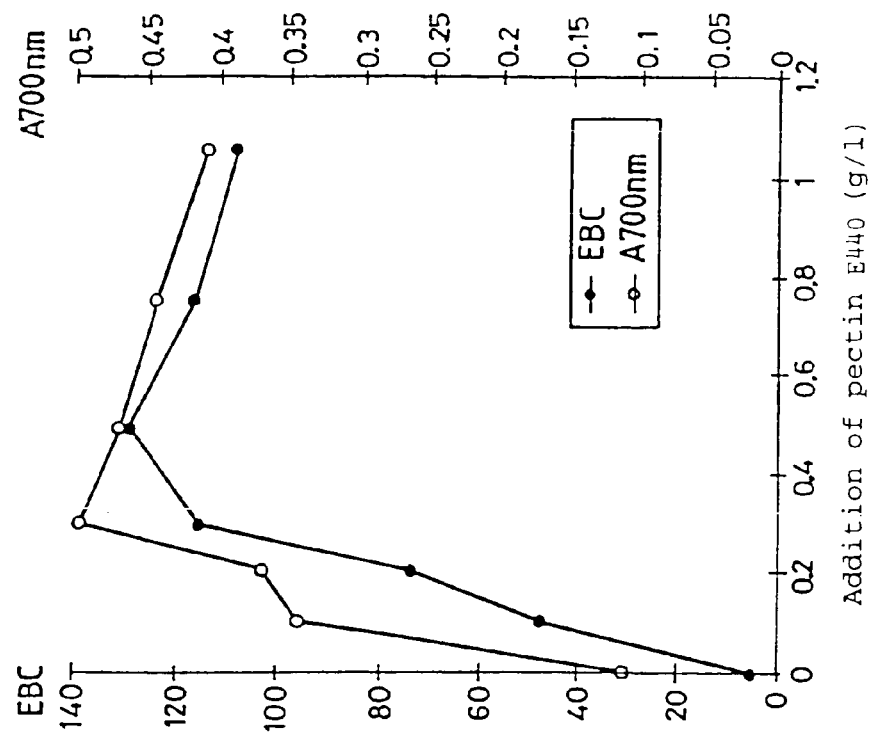
FIG_2
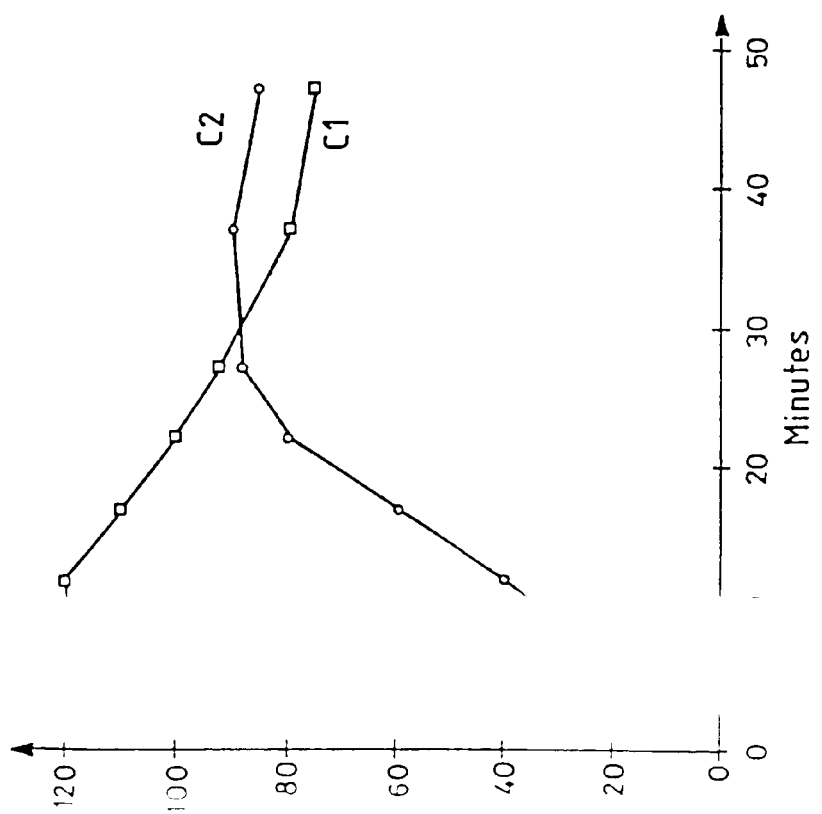
FIG_1

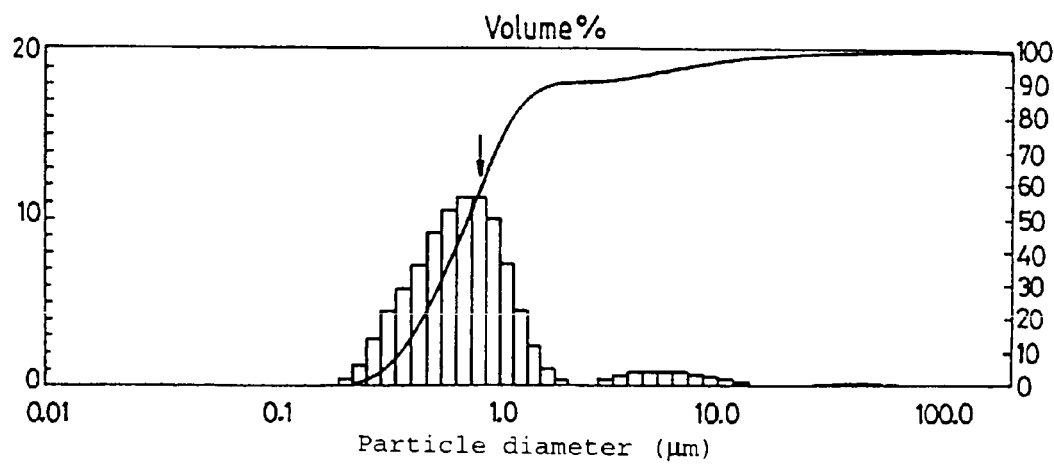
FIG_3
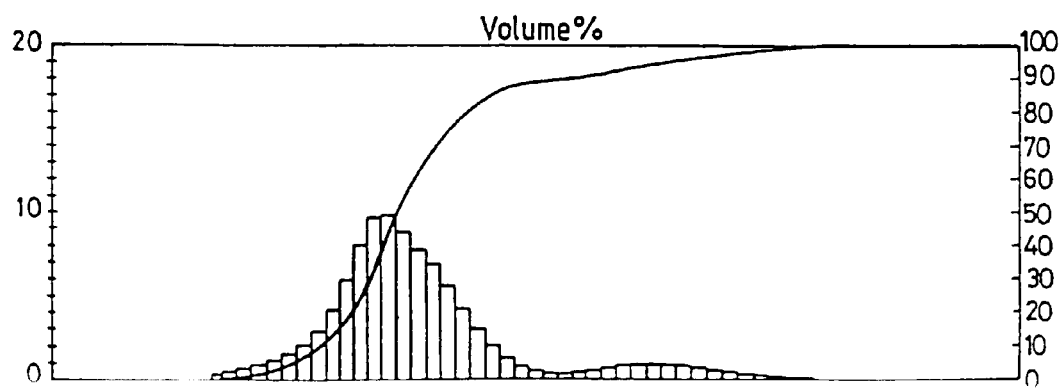
FIG_4

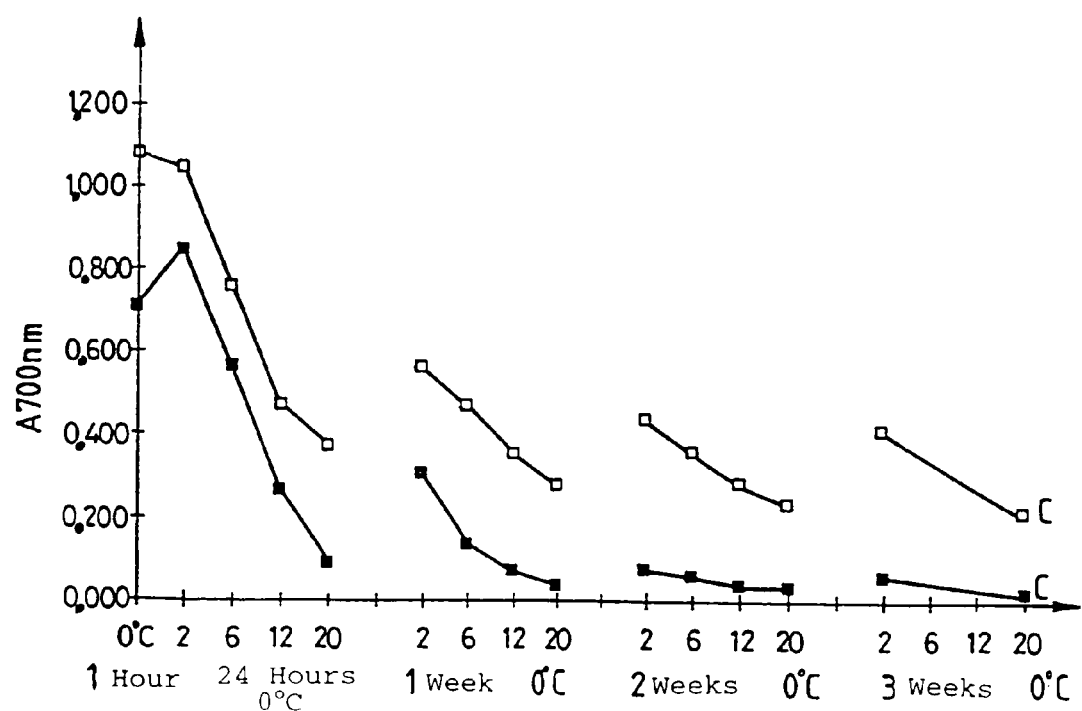
FIG_5

METHOD FOR PREPARING BEER

BACKGROUND OF THE INVENTION

The present invention relates to a fermented beverage with beer wort base.

It also relates to a method for preparing a fermented beverage with beer wort base.

It finally relates to a use of compounds for enhancing some of the qualities of fermented beverages.

Generally, the preparation of a Pils-type beer uses a series of steps designed to obtain a beer which is as clear as possible. These various steps comprise in particular precipitation, adsorption, centrifugation and filtration of the beer wort. Pils-type beers are then considered as being colloidally stable when they no longer develop any haze at the end of their preparation cycle and during their storage.

In contrast to Pils-type beers, in order to be liked by the consumer, some special beers have the main characteristic of exhibiting, at the time of their consumption, a haze which is abundant and persistent to a greater or lesser degree and which gives them the appearance of an unfiltered beer and confers on them a nonindustrial and natural character.

In these type of beers, the haze is generally due to the presence of yeasts, of suspended particles, mainly proteins, which may be very different in size and compositions. Indeed, the main fraction of the suspension depends on the method of preparation and the conditions for storing the finished beer, especially on the prior duration of decantation and on the temperature at which it is carried out.

Two main types of haze are generally distinguishable according to their behaviour as a function of the temperature.

The first type corresponds to so-called irreversible hazes which remain after heating the beer to a temperature of the order of 15° C. The main particles encountered in irreversible hazes are especially yeasts, protein or starch particles and oxalate crystals.

The second type corresponds to the so-called reversible hazes which form during cooling of the beer to the temperature for consumption, generally less than about 12° C., and which disappear completely or partially with heating of the beer. Reversible haze mainly consists of proteins and polyphenols.

After preparation, most of the hazes encountered in beers tend to sediment during storage, finally giving a beer which is clarified to a greater or lesser degree as well as a deposit.

This deposit can be resuspended by shaking at the time the beer is served, so as to again obtain a beverage having an adequate haze.

It can be easily understood, however, that such a way of operating is not systematically observed by the consumer.

It is therefore important for the brewer to be able to offer a beer having a haze of good quality and capable of persisting, at least until the beer is consumed, without the need for a specific operation by the consumer.

A method is known from WO 96/04363 for improving the stability of the foam produced by some beverages such as beer, consisting in adding one or more pectins during or after the process of preparing such a beverage.

It is also known that other polysaccharides have the same property, for example gums or modified starches or cellulose derivatives.

It is also known that the addition of a carrageenan to a hot wort stimulates the coagulation of the soluble proteins contained in this wort and facilitates the sedimentation of the proteins and therefore the clarification of the beer.

SUMMARY OF THE INVENTION

The aim of the invention is to respond, to a large degree, to this aim by providing a new fermented beverage with beer wort base having an improved haze.

A first object of the present invention is to provide a fermented beverage with beer wort base whose haze stability is improved.

Another object of the present invention relates to a method for preparing a fermented beverage with beer wort base having a haze with improved persistence.

Another object of the present invention relates to the use of specific compounds for stabilizing the hazes in fermented beverages with beer wort base.

The fermented beverage according to the invention, with beer wort base, is characterized in that it comprises a natural or synthetic additive capable of forming at least temporarily stable complexes with protein fractions of the said wort or of the said beverage, or of forming a suspension at least temporarily stable in the said wort or the said beverage, the said additive being present in the said fermented beverage, at least during its preparation, in a proportion sufficient for obtaining a satisfactory haze in the finished beverage.

The inventors of the present patent application have indeed discovered, surprisingly, that the hazes could be improved by the action of compounds capable of inhibiting the coagulation and precipitation of the proteins contained in the wort used to prepare the said beverage or in the finished beverage, forming for example with them complexes which are stable for a certain period, or forming a suspension in the wort.

According to the invention, the additive is soluble in water. Within the framework of the present invention, "soluble in water" is understood to mean a product which can form an aqueous solution at a concentration of at least about 10 mg/l of water.

Advantageously, the additive consists of one or more polysaccharides chosen from the group comprising in particular starch derivatives, cellulose derivatives, pectin or its derivatives, in particular amidated pectin (E 440), carbohydrate gums or their derivatives.

There may be mentioned by way of nonlimiting examples of cellulose derivatives which can be used within the framework of the present invention hemicellulose, microcrystalline cellulose (E 460), methyl cellulose (E 461), hydroxypropylcellulose (E 463), hydroxypropylmethylcellulose (E 464), methylethylcellulose (E 465) and carboxymethylcellulose (E 466).

There may be mentioned as nonlimiting examples of starch derivatives which can be used within the framework of the present invention the modified starches E 1404 to E 1450 as described in the European Directive 95/2/EC No. L61/1 of 20/02/1995.

There may be mentioned as nonlimiting examples of gums which can be used within the framework of the present invention xanthan gum (E 415), gum tragacanth (E 413), gum acacia, alginic acid (E 400) and its salts, especially of sodium (E 401), of potassium (E 402), of ammonium (E 403), of calcium (E 404), propylene glycol alginate (E 405), karaya gum (E 416).

Other polysaccharides which can be used within the framework of the present invention comprise those belonging to the family of carrageenans.

The numbers corresponding to the European legislation in the area of food products for some of the products which can be used within the framework of the present invention, from the publication Eurofood Monitor, European Union Legislation on Foodstuffs, Agra Europe (London) Ltd., are indicated in the preceding text.

According to a first embodiment of the present invention, the additive comprises a polysaccharide as defined above.

According to another embodiment of the present invention, the additive comprises a mixture of several polysaccharides as defined above.

The subject of the invention is also a method for preparing a fermented beverage with beer wort base. The method according to the invention preferably comprising the steps of cooking, boiling, cooling, fermenting the wort and of storing the beverage obtained, is characterized in that a natural or synthetic additive capable of forming at least temporarily stable complexes with protein fractions of the said wort or of the said beverage or of forming a suspension at least temporarily stable in the said wort or the said beverage is added during the preparation of the said beverage.

It is not necessary to describe in greater detail here the steps of cooking, boiling or fermenting the wort. These indeed correspond to those commonly used in the brewing industry. Persons skilled in the art can refer to conventional mashing, malting and hopping techniques, as described, for example, in the publication "Bières et Coolers [Beers and Coolers]" M. Moll, Collection Sciences et Techniques agro-alimentaires, Apria, Paris 1991.

According to the invention, the additive essentially consists of one or more polysaccharides as defined in the preceding text.

The additive is added, in powdered form or preferably in the form of an aqueous solution, at any of the steps of preparing the fermented beverage. According to a first embodiment of the present invention, the additive is added at any time between the beginning of the step of boiling the wort and the beginning of the step of cooling the wort.

According to yet another embodiment of the method of the present invention, the additive is added to the finished product.

The additive is added according to the invention in a proportion ranging from about 5 to about 2000 mg/l of wort or beverage, preferably about 10 to about 1000 mg/l of wort or beverage, still more preferably from about 50 to about 500 mg/l of wort or beverage.

The lower proportions used depend on the type of polysaccharide used, the physicochemical composition of the beverage, the time of adding and the degree of purity of the polysaccharide.

The criterion of purity of the polysaccharides is not an essential factor for the application of the invention because the proportions applied simply have to be adjusted as a consequence. Thus, for example, pectin may be introduced in the form of a crude or impure source, such as a fruit fraction, extract or concentrate.

In the specific case where the polysaccharide has to be extracted and solubilized during the method, the preferred form for addition is in the hot wort.

Higher proportions are generally limited by problems of secondary effects of visual or organoleptic deviation which is specific to each polysaccharide and each type of beverage, such as for example the formation of a precipitate, an excessively high viscosity, a destabilization of the foam, or the appearance of unacceptable tastes.

Persons killed in the art will easily find the optimum conditions for addition which are characteristic to their own beverage by carrying out a limited series of systematic empirical trials.

The subject of the invention is also the use, for increasing the quality of the hazes of fermented beverages prepared from beer wort, of one or more natural or synthetic water-soluble polysaccharides capable of forming at least temporarily stable complexes with protein fractions of the beer wort or of forming a suspension at least temporarily stable in the said wort or the said beverage.

According to the invention, the polysaccharides which can be used are as defined in the preceding text.

BRIEF DESCRIPTION OF THE DRAWINGS

Additional advantages and characteristics of the invention will also appear in the light of the more detailed description which follows of exemplary embodiments of the present invention which are given purely by way of illustration and with no limitation being implied, and the figures relating thereto and in which:

FIG. 1 is a graph representing the effect on the protein break of an additive according to the invention;

FIG. 2 is a graph illustrating the effect on the haze of a wort of increasing proportions of an additive according to the invention;

FIG. 3 is a representation by histograms of the size distribution of protein particles of a first beer sample which has received no additive according to the invention;

FIG. 4 is a representation by histograms of the size distribution of protein particles of a second beer sample which has received an additive according to the invention; and FIG. 5 is a graph representing the change in the haze in two beer samples as a function of the duration of storage in the cold and of the temperature at which the beer is served.

DETAILED DESCRIPTION OF THE PREFERRED EMBODIMENT(S)

The basic principle of the invention is to produce complexes between the polysaccharides introduced and the proteins in the wort or in the beer. Depending on the reactivity of the polysaccharides and their time of use, these complexes may spontaneously precipitate in the form of a haze, or may modify the conditions for precipitation of proteins during the process or in the finished beer.

Gum acacia contains a glycoprotein fraction which possesses properties for stabilizing colloidal systems. The reactivity of this gum is weak in the sense that it does not create immediate haze in the beer, but its effect becomes perceptible during the formation, from decantation, of the reversible cold haze. This gum is preferably added at the end of the process in order to avoid its thermal degradation.

Pectin reacts with proteins which precipitate during the cooling of the wort or of the beer. It follows that the first result of an addition to hot wort will be the formation of a permanent haze which will remain during the process and in the finished beer, and the second result will be to modify the conditions for the formation and precipitation of the reversible cold haze in the finished beer.

Pectin may also be introduced into the beer so as to preferentially act on the stabilization of the reversible fraction of the haze formed at low temperature.

The addition of carrageenans to the wort is a common practice in brewery in order to promote the clarification of the wort by accelerating the precipitation and the flocculation of protein break. In the invention, the high reactivity of carrageenans towards proteins is on the contrary exploited in order to create and maintain a permanent haze in the beer at room temperature. The action of this polysaccharide also manifests itself in slowing down the speed of sedimentation of the protein particles in the haze which forms during the cooling of the finished beer.

EXAMPLE 1

In this example, the effect of an additive in accordance with the invention on the quality of the haze of a beer is studied.

To do this, two beer wort samples are collected during a cycle for production of a special beer, during the cooking step. The first sample (sample A) receives no additive and serves as a control. The second sample (sample B) receives an additive consisting of pectin, in a proportion of 0.30 g/l of wort.

The pectin used is the product commercially available under the name Pectine Q 40 from the company Sanofi, France.

The two samples A and B are placed in 500-ml graduated tubes.

The quality of the haze of the two worts is evaluated in the following manner. The decantation volume of the protein break containing the protein fractions coagulated and which have precipitated is measured.

This method of evaluating the haze of the wort is in particular described in the publication "Bières et Coolers", Paris, 1991, p 130.

Now with reference to FIG. 1, it appears that the formation of the protein break of sample B (curve C2) is slowed down, in comparison of that of sample A (curve C1).

Given that a rapid and high protein break corresponds to a weak persistent haze, pectin therefore acts as a factor inhibiting and reducing the protein break, and consequently as a factor which increases the quality of the haze in the beer.

This is clearly demonstrated in FIG. 2, which shows the effect of the concentration of pectin Q40 added to the hot wort on the formation of haze at 20° C. in the cooled and centrifuged wort.

The results indicated in FIG. 2 are obtained in the following manner:

The hot wort (100° C.) is collected at the end of the cooking step and divided into samples without addition of pectin (0 g/l), or with addition of pectin (0.1 g/l, 0.2 g/l, 0.3 g/l, 0.5 g/l, 0.75 g/l or 1 g/l). After dissolution of the pectin by gentle stirring for 5 min, the samples of wort are cooled to 20° C. and centrifuged (2500×g, 15 min). The haze is measured in each supernatant, by absorbance (A 700 nm) or by nephelometry (EBC units).

The relative distribution of the size of the protein particles in the beers obtained from the two worts of type A and B is then measured by photon correlation spectroscopy using a Mastersizer apparatus (Malvern Instruments, Great Britain). The results are given in FIGS. 3 and 4.

It appears from FIG. 3 that the type A beer particles possess a mean diameter of about 0.8 µm whereas with reference now to FIG. 4, the type B beer particles possess a mean diameter of about 0.3 µm, demonstrating the role of pectin in the inhibition of coagulation and of the precipitation of the proteins in the wort.

The two beers A and B are then stored at 0° C. for two weeks. The haze is evaluated by measuring the absorbance at 700 nm by visible UV spectrometry (1 cm cell) after 24 hours, one week, two weeks and three weeks of storage, and by heating the beer from 0° C. to 20° C.

It appears in FIG. 5 that the intensity of the hazes of the two beer samples decreases during storage but that the beer which did not receive pectin (curve C3) possesses a haze of lower intensity than the beer which received pectin (curve C4).

The improvement in the stability of the haze during storage appears through the expression of two phenomena. On the one hand, the so-called "permanent" haze because it persists after heating to 20° C. in glass, is 4 to 10 times higher in the test compared with the beer without pectin, even after a prolonged period of decantation at 0° C. Moreover, the fraction of the so-called "reversible" cold haze, calculated by the difference between the value measured at 2° C. and that measured at 20° C., is also higher in the test, compared with the beer without pectin, after 3 weeks of decantation at 0° C. The latter stabilizing effect on the reversible fraction of the haze is similar to that described in Table 1 in the annex.

EXAMPLE 2

In this example, several additives according to the invention are tested.

The additives used in Example 2 are no longer added during the cooking of the wort, as was the case in Example 1, but to the finished beer. The samples are stored at 0° C. for a period of four weeks. The haze of the decanted beer is evaluated at 2° C. and after heating in a glass at 20° C., using the same method as that described in Example 1.

The results are given in Table 1 presented in the annex of the present patent application.

It appears from the results obtained that all the additives used have an effect of slowing down the speed of sedimentation of the reversible fraction of the haze of the beer and consequently prolong the persistence of the haze in the product. On the other hand, the proportions to be used for each product can vary considerably from one product to another.

The carrying out of the invention allows the production of beverages possessing a permanent haze of good quality for at least four weeks, at a storage temperature of 20° C., and of beverages possessing a reversible haze of good quality for at least three weeks, at a storage temperature of 0° C.

In the specific case of the additive 2 (carregeenan), a slight increase in the permanent haze measured at 20° C. is also observed (0.074 A on average, at least 0.027 A in the control).

It goes without saying that the present invention is not intended to be limited to the exemplary embodiments which have just been described, but encompasses on the contrary all the variants.

Persons skilled in the art will have all the time to adapt the present invention to their own needs simply by carrying out optimization operations without as a result departing from the scope of the essential features thereof, as defined in the claims which follow.

Annex

TABLE 1

| Duration of storage at ° C. | Control beer without additive | | Additive 1 | | Additive 2 | | Additive 3 | |
|---|---|---|---|---|---|---|---|---|
| T (° C.) | 2 | 20 | 2 | 20 | 2 | 20 | 2 | 20 |
| 7 days | 0.310 | 0.037 | 0.527 | 0.029 | 0.521 | 0.099 | 0.484 | 0.020 |
| 14 days | 0.102 | 0.029 | 0.416 | 0.057 | 0.352 | 0.096 | 0.241 | 0.019 |

TABLE 1-continued

| Duration of storage at ° C. | Control beer without additive | | Additive 1 | | Additive 2 | | Additive 3 | |
|---|---|---|---|---|---|---|---|---|
| T (° C.) | 2 | 20 | 2 | 20 | 2 | 20 | 2 | 20 |
| 21 days | 0.083 | 0.038 | 0.377 | 0.037 | 0.285 | 0.084 | 0.165 | 0.020 |
| 28 days | 0.052 | 0.027 | 0.161 | 0.016 | 0.242 | 0.074 | 0.097 | 0.020 |

Additive 1: gum acacia, commercially available from the company Janssen Pharmaceuticals, Belgium at a dose of 1000 mg/l of beer
Additive 2: carrageenan E 407 satia gum E, commercially available from the company Sanofi, France at a dose of 10 mg/l of beer
Additive 3: pectin E 440 (70 to 80% purity), commercially available from the company Sanofi, France, at a dose of 100 mg/l of beer

What is claimed is:

1. A method for preparing a beer from a beer wort, said method comprising the steps of cooking, boiling, and fermenting said beer wort as for a pils-type beer, wherein said method further comprises, in contrast to a pils-type beer, a step of adding amidated pectin to the wort, prior to the cooling the wort, or to the beer and a step of centrifuging the wort, said pectin adding step comprising adding amidated pectin in a proportion of between 5 mg/l and 2000 mg/l of wort or of beer in order to inhibit coagulation and precipitation of proteins, said pectin adding step and said centrifuging step being conducted so as to obtain at least one of a persistent irreversible haze in the beer which remains at a temperature of 15° C. and a reversible haze in the beer which remains at a temperature below 12° C. and disappears at 15° C., said persistent irreversible haze and said reversible haze each having predetermined characteristics in terms of intensity and persistence during storage.

2. A method according to claim 1, further comprising introducing said pectin into the beer wort while in a heated condition so as to create a permanent haze.

3. A method according to claim 1, further comprising introducing said pectin into the beer when finished so as to slow down the speed of sedimentation of the reversible haze and to maintain said reversible haze in suspension.

4. A method according to claim 1, further comprising adding said pectin in a proportion of between 10 mg/l and 1000 mg/l of wort or beer.

5. A method according to claim 4, wherein said adding step comprises adding said pectin in a proportion of between 50 mg/l and 500 mg/l of wort or beer.

6. A method according to claim 4, wherein said adding step comprises adding said pectin in a proportion on the order of from 100 mg/l to 300 mg/l of wort or beer.

7. A method according to claim 1, wherein said pectin adding step comprises varying the proportion of said pectin which is added inversely to the degree of reactivity and the degree of purity of said pectin and to be dependent upon the time when the pectin is added.

8. A method according to claim 1, further comprising adding said pectin in a quantity and under conditions which create beer particles having a mean diameter of 0.3 μm.

9. A method for preparing a fermented beverage including a beer prepared from a beer wort, said method comprising a preparing step including a step of adding amidated pectin to the wort in sufficient amount to inhibit coagulation and precipitation of proteins and to maintain a permanent haze during the beer making and in the finished beer, cooling said beer wort after addition of the pectin, and centrifuging said cooled beer wort.

10. A method according to claim 9 wherein said adding step comprises adding said pectin in a proportion of between 10 mg/l and 1000 mg/l of wort.

11. A method according to claim 9 wherein said adding step comprises adding said pectin in a proportion of between 50 mg/l and 500 mg/l or wort.

12. A method according to claim 9 wherein said adding step comprises adding said pectin in a proportion of between 100 mg/l to 300 mg/l of wort.

13. A method according to claim 9 wherein said adding step comprises adding said pectin in a proportion of between 5 mg/l and 2000 mg/l of wort.

14. A method for preparing a fermented beverage including a beer from a beer wort, said method comprising a preparing step including a step of adding amidated pectin to the wort in sufficient amount to inhibit coagulation and precipitation of proteins and to maintain a reversible haze during the beer making and in the finished beer, cooling the beer wort after addition of said pectin, and centrifuging the cooled beer wort.

15. A method according to claim 14 wherein said adding step comprises adding said pectin in a proportion of between 10 mg/l and 1000 mg/l of wort.

16. A method according to claim 14 wherein said adding step comprises adding said pectin in a proportion of between 50 mg/l and 500 mg/l of wort.

17. A method according to claim 14 wherein said adding step comprises adding said pectin in a proportion of between 100 mg/l to 300 mg/l of wort.

18. A method according to claim 14 wherein said adding step comprises adding said pectin in a proportion of between 5 mg/l and 2000 mg/l of wort.

19. A method for preparing a beer from a beer wort, said method comprising steps of cooking, boiling, and fermenting said beer wort, as for a pils-type beer, wherein said method further comprises, in contrast to a pils-type beer, a step of adding amidated pectin to the wort prior to cooling to the wort or to the beer and a step of centrifuging the wort, said pectin adding step comprising adding said amidated pectin in a predetermined proportion in order to inhibit coagulation and precipitation of proteins, said pectin adding step and said centrifuging step being conducted so as to obtain at least one of a persistent irreversible haze in the beer which remains at room temperature and a reversible haze in the beer which forms at low temperature and disappears at room temperature, said persistent irreversible haze and said reversible haze each having predetermined characteristics in terms of intensity and persistence during storage.

20. A method according to claim 19, including adding said pectin in a proportion of between 5 mg/l and 2000 mg/l of wort or of beer.

21. A method for preparing a beer from a beer wort, said method comprising steps of cooking, boiling, and fermenting said beer wort, as for a pils-type beer, wherein said method further comprises, in contrast to a pils-type beer, a step of adding amidated pectin to the wort prior to cooling the wort or to the beer and a step of centrifuging the wort, said pectin adding step comprising adding said amidated pectin in a predetermined proportion in order to inhibit coagulation and precipitation of proteins, said pectin adding step and said centrifuging step being conducted so as to obtain at least one of a persistent irreversible haze in the beer which remains at a temperature of 20° C. and a reversible haze in the beer which remains at a temperature of 2° C. and disappears at 20° C., said persistent irreversible haze and said reversible haze each having predetermined characteristics in terms of intensity and persistence during storage.

22. A method according to claim 21, including adding said pectin in a proportion of between 5 mg/l and 2000 mg/l of wort or of beer.

* * * * *